US009395976B2

(12) United States Patent
Iijima

(10) Patent No.: US 9,395,976 B2
(45) Date of Patent: Jul. 19, 2016

(54) INFORMATION PROCESSING APPARATUS, FIRMWARE RENEWING METHOD, AND COMPUTER PROGRAM

(71) Applicant: Oki Data Corporation, Tokyo (JP)

(72) Inventor: Osamu Iijima, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/224,678

(22) Filed: Mar. 25, 2014

(65) Prior Publication Data

US 2014/0298310 A1  Oct. 2, 2014

(30) Foreign Application Priority Data

Mar. 28, 2013  (JP) ................................. 2013-069526

(51) Int. Cl.
 *G06F 9/445* (2006.01)
 *G06F 9/44* (2006.01)
(52) U.S. Cl.
 CPC ...................................... *G06F 8/665* (2013.01)
(58) Field of Classification Search
 USPC .......................................................... 717/175
 See application file for complete search history.

(56) References Cited

U.S. PATENT DOCUMENTS

| 6,360,362 | B1* | 3/2002 | Fichtner et al. | 717/168 |
| 6,675,382 | B1* | 1/2004 | Foster | G06F 8/61 |
| | | | | 707/999.001 |
| 7,904,895 | B1* | 3/2011 | Cassapakis | G06F 8/665 |
| | | | | 711/115 |
| 7,921,420 | B2* | 4/2011 | Ferlitsch | 717/170 |
| 2002/0022990 | A1* | 2/2002 | Kurata et al. | 705/14 |
| 2003/0066066 | A1* | 4/2003 | Nguyen et al. | 717/173 |
| 2003/0177223 | A1* | 9/2003 | Erickson et al. | 709/224 |
| 2003/0195951 | A1* | 10/2003 | Wittel et al. | 709/220 |
| 2004/0208182 | A1* | 10/2004 | Boles et al. | 370/395.5 |
| 2005/0066019 | A1* | 3/2005 | Egan et al. | 709/223 |
| 2005/0190393 | A1* | 9/2005 | Bledsoe | G06F 8/65 |
| | | | | 358/1.13 |
| 2006/0117312 | A1* | 6/2006 | Seo | 717/168 |
| 2006/0244986 | A1* | 11/2006 | Ferlitsch | 358/1.13 |
| 2006/0248329 | A1* | 11/2006 | Swanson et al. | 713/100 |
| 2008/0127165 | A1* | 5/2008 | Mullis et al. | 717/173 |
| 2011/0214112 | A1* | 9/2011 | Vidal et al. | 717/168 |
| 2012/0192173 | A1* | 7/2012 | Price | 717/172 |
| 2012/0297375 | A1* | 11/2012 | Burke, Jr. | 717/173 |
| 2014/0157251 | A1* | 6/2014 | Hocker et al. | 717/170 |
| 2014/0173579 | A1* | 6/2014 | McDonald | G06F 8/65 |
| | | | | 717/170 |
| 2014/0298310 | A1* | 10/2014 | Iijima | 717/170 |

FOREIGN PATENT DOCUMENTS

| JP | 2000-267857 A | 9/2000 |
| JP | 2006-268203 A | 10/2006 |
| JP | 2009-230400 A | 10/2009 |
| JP | 2010-186452 A | 8/2010 |

* cited by examiner

*Primary Examiner* — Marina Lee
(74) *Attorney, Agent, or Firm* — Panitch Schwarze Belisario & Nadel LLP

(57) ABSTRACT

An invented information processing apparatus includes a firmware renewal unit for renewing the firmware stored in the electronic device to be new firmware, a version retrieval unit for retrieving firmware version information indicating a version of the new firmware, a renewal information retrieval unit for detecting the version of the software compatible with the new firmware using the software version information, a version confirmation unit for selecting software of a newly required version, and an installation unit for installing the software of the newly required version.

20 Claims, 13 Drawing Sheets

FIG. 5A

| FW Version | SW Version 1 | SW Version 2 | SW Version 3 |
|---|---|---|---|
| 1.0.1 | Color Utility, 1.1.0, http://www.samples.co.jp/colorsw.html | — | — |
| 1.0.2 | Color Utility, 1.1.4, http://www.samples.co.jp/colorsw.html | Network Utility, 1.0.5, http://www.samples.co.jp/networksw.html | — |
| 1.0.3 | Color Utility, 1.1.5, http://www.samples.co.jp/colorsw.html | Network Utility, 1.0.6, http://www.samples.co.jp/networksw.html | Scanner Utility, 1.0.0, http://www.samples.co.jp/scannersw.html |
| ⋮ | ⋮ | ⋮ | ⋮ |
| 1.1.0 | Color Utility, 1.1.5, http://www.samples.co.jp/colorsw.html | Network Utility, 1.0.6, http://www.samples.co.jp/networksw.html | Scanner Utility, 1.0.1, http://www.samples.co.jp/scannersw.html |

FIG. 5B

| FW Version | SW Version 1 | SW Version 2 | SW Version 3 |
|---|---|---|---|
| 1.0.3 | Color Utility, 1.1.5, http://www.samples.co.jp/colorsw.html | Network Utility, 1.0.6, http://www.samples.co.jp/networksw.html | Scanner Utility, 1.0.0, http://www.samples.co.jp/scannersw.html |

FIG. 5C

| KEY | VALUE |
|---|---|
| SAMPLE_LOCAL¥SOFTWARE¥SAMPLE¥SAMPLE¥Color Utility¥Version | 1.0.1 |
| SAMPLE_LOCAL¥SOFTWARE¥SAMPLE¥SAMPLE¥Network Utility¥Version | 1.0.6 |

FIG.6

| SW Version 1 | SW Version 3 |
|---|---|
| Color Utility,<br>1.1.5,<br>http://www.samples.co.jp/colorsw.html | Scanner Utility,<br>1.0.0,<br>http://www.samples.co.jp/scannersw.html |

FIG.7A

THE FIRMWARE VERSION WAS UPDATED TO 1.0.3.
ACCORDING TO THIS UPDATE, THE FOLLOWING SOFTWARE WAS RENEWED OR NEWLY INSTALLED.

[RENEWAL INSTALLATION]
Color Utility Version 1.1.5
[NEW INSTALLATION]
Scanner Utility Version 1.0.0

THE FIRMWARE VERSION WAS UPDATED TO 1.0.3.
ACCORDING TO THIS UPDATE, THERE WAS NO SOFTWARE NECCESARY TO BE RENEWED OR NEWLY INSTALLED.

| FW Version | SW Version 1 | SW Version 2 | SW Version 3 | DRV Version |
|---|---|---|---|---|
| 1.0.1 | Color Utility, 1.1.0, http://www.samples.co.jp/colorsw.html, DRV: 1.0.0 | — | — | C2222, C:¥Driver, OKJ3C039, http://www.samples.co.jp/driver.html, 1.0.0 |
| 1.0.2 | Color Utility, 1.1.4, http://www.samples.co.jp/colorsw.html, DRV: 1.0.0 | Network Utility, 1.0.5, http://www.samples.co.jp/networksw.html, DRV: — | — | C2222, C:¥Driver, OKJ3C039, http://www.samples.co.jp/driver.html, 1.0.0 |
| 1.0.3 | Color Utility, 1.1.5, http://www.samples.co.jp/colorsw.html, DRV: 1.0.5 | Network Utility, 1.0.6, http://www.samples.co.jp/networksw.html, DRV: — | Scanner Utility, 1.0.0, http://www.samples.co.jp/scannersw.html, DRV: 1.0.0 | C2222, C:¥Driver, OKJ3C039, http://www.samples.co.jp/driver.html, 1.0.1 |
| ... | | | ... | ... |
| 1.1.0 | Color Utility, 1.1.5, http://www.samples.co.jp/colorsw.html, DRV: 1.0.5 | Network Utility, 1.0.6, http://www.samples.co.jp/networksw.html, DRV: — | Scanner Utility, 1.0.1, http://www.samples.co.jp/scannersw.html, DRV: 1.0.1 | C2222, C:¥Driver, OKJ3C039, http://www.samples.co.jp/driver.html, 1.0.2 |

| FW Version | SW Version 1 | SW Version 2 | SW Version 3 | DRV Version |
|---|---|---|---|---|
| 1.0.3 | Color Utility, 1.1.5, http://www.samples.co.jp/colorsw.html, DRV: 1.0.5 | Network Utility, 1.0.6, http://www.samples.co.jp/networksw.html, DRV: — | Scanner Utility, 1.0.0, http://www.samples.co.jp/scannersw.html, DRV: 1.0.0 | C2222, C:¥Driver, OKJ3C039, http://www.samples.co.jp/driver.html, 1.0.1 |

FIG. 12B

| FW Version | SW Version 1 | SW Version 2 | SW Version 3 | DRV Version |
|---|---|---|---|---|
| 1.0.3 | Color Utility, 1.1.5, http://www.samples.co.jp/colorsw.html, DRV: 1.0.5 | Network Utility, 1.0.6, http://www.samples.co.jp/networksw.html, DRV: — | Scanner Utility, 1.0.0, http://www.samples.co.jp/scannersw.html, DRV: 1.0.0 | C2222, C:¥Driver, OKJ3C039, http://www.samples.co.jp/driver.html, 1.0.5 |

FIG. 12C

| KEY | VALUE |
|---|---|
| SAMPLE_LOCAL¥SOFTWARE¥SAMPLE¥Color Utility¥Version | 1.0.1 |
| SAMPLE_LOCAL¥SOFTWARE¥SAMPLE¥Network Utility¥Version | 1.0.6 |

FIG.13

[Version]
DriverVer=01/20/2012, 1.0.1

FIG.14

| SW Version 1 | SW Version 3 | DRV Version |
|---|---|---|
| Color Utility, 1.1.5, http://www.samples.co.jp/colorsw.html, | Scanner Utility, 1.0.0, http://www.samples.co.jp/scannersw.html, | C2222, C:¥Driver, OKJ3C039, http://www.samples.co.jp/driver.html, 1.0.5 |

FIG.15A

THE FIRMWARE VERSION WAS UPDATED TO 1.0.3.
ACCORDING TO THIS UPDATE, THE FOLLOWING SOFTWARE/PRINTER DRIVER
WAS RENEWED OR NEWLY INSTALLED.

[RENEWAL INSTALLATION]
Color Utility Version 1.1.5
[NEW INSTALLATION]
Scanner Utility Version 1.0.0
[PRINTER DRIVER]
C2222 Version 1.0.5

THE FIRMWARE VERSION WAS UPDATED TO 1.0.3.
ACCORDING TO THIS UPDATE, THERE WAS NO SOFTWARE/PRINTER DRIVER
NECCESARY TO BE RENEWED OR NEWLY INSTALLED.

OK

INFORMATION PROCESSING APPARATUS, FIRMWARE RENEWING METHOD, AND COMPUTER PROGRAM

CROSS REFERENCE TO RELATED APPLICATION

This application claims priority benefits under 35 USC, section 119 on the basis of Japanese Patent Application No. 2013-069526, the disclosure of which is incorporated herein by reference.

BACKGROUND OF THE INVENTION

1. Field of the Invention

This invention relates to an art for renewing firmware of an electronic device such as an image forming apparatus.

2. Description of Related Art

Recently, there provide electronic devices having firmware renewal function to retrieve updated firmware through a telecommunication line such as computer network and telephone line and to rewrite or overwrite the old firmware with the updated firmware. For example, Japanese Patent Application Publication No. 2000-267857 (A1) discloses an art in which updated firmware is downloaded using data receiving function of a facsimile machine and to renew the old firmware with the updated firmware.

SUMMARY OF THE INVENTION

With the prior art firmware renewal art, however, the software operating in association with the firmware may not be compatible with the renewed new firmware, so that all or a part of functions realized by the software may not operate in a normal way. In such a case, a user may have to seek software compatible with the renewed firmware and to re-install the software in the computer system, and may be suffered from laborious problems such that the previous firmware may be required to back in operation.

In consideration on above problems, it is an object of the invention to provide an information processing apparatus automatically renewing, when necessary, software operating in association with firmware after the firmware is renewed. It is also another object of the invention to provide a firmware renewing method for renewing firmware in the information processing apparatus. It is yet another object of the invention to provide a computer program executing such a firmware renewing method.

To solve the above problems, an information processing apparatus according to a preferred embodiment of the invention is an information processing apparatus installing software operable in association with firmware stored in an electronic device, comprising: a firmware renewal unit for renewing the firmware stored in the electronic device to be new firmware; a version retrieval unit for retrieving firmware version information indicating a version of the new firmware; a renewal information retrieval unit for detecting the version of the software compatible with the new firmware using the software version information and for outputting renewal information indicating a consequence thus detected; a version confirmation unit for selecting software of a newly required version in comparing the version of the currently installed software with the renewal information; and an installation unit for installing the software of the newly required version in this information processing apparatus.

As another aspect of the invention, a firmware renewing method according to a preferred embodiment of the invention is for renewing firmware with new firmware in an information processing apparatus installing software operable in association with the firmware stored in an electronic device, comprising the steps of: retrieving firmware version information indicating a version of the new firmware; detecting a version of software compatible with the new firmware using the firmware version information to output renewal information indicating a consequence thus detected; selecting software of the newly required version in comparing the version of the software currently installed with the renewal information; and installing the software of the newly required version in the information processing apparatus.

As yet another aspect of the invention, a computer program according to a preferred embodiment of the invention is for rendering a processor executing a firmware renewal processing in an information processing apparatus installing software operable in association with firmware stored in an electronic device, and the computer program is executed upon read out of a recording medium that can be read with the processor. The firmware renewal processing comprises the steps of the firmware renewing method.

According to the invention, at a renewal of firmware for an electronic device, the software operating in association with firmware is automatically renewed to software of a new version compatible with the renewed firmware, or software of the new version compatible with the renewed firmware can be newly installed. Accordingly, the software of the new version compatible with the renewed firmware can have a suitable version after the firmware is renewed.

BRIEF DESCRIPTION OF DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIGS. 5A to 5C are tables according to the first embodiment; FIG. 5A shows an example of version list information; FIG. 5B shows software renewal information; FIG. 5C shows an example of registry information;

FIG. 6 is a table showing selected information;

FIGS. 7A and 7B are illustrations of examples of message boxes appearing when the firmware is updated;

FIG. 11 is a table showing an example of version list information according to the second embodiment;

FIGS. 12A to 12C are tables according to the second embodiment; FIG. 12A shows software renewal information; FIG. 12B shows contents of software renewal information after renewal; FIG. 12C shows an example of registry information;

FIG. 13 is a diagram showing an example of contents of a driver version file;

FIG. 14 is a table showing selected information; and

FIGS. 15A and 15B are illustrations of examples of message boxes appearing when the firmware is updated.

DETAILED DESCRIPTION OF EMBODIMENTS

Figure 1:
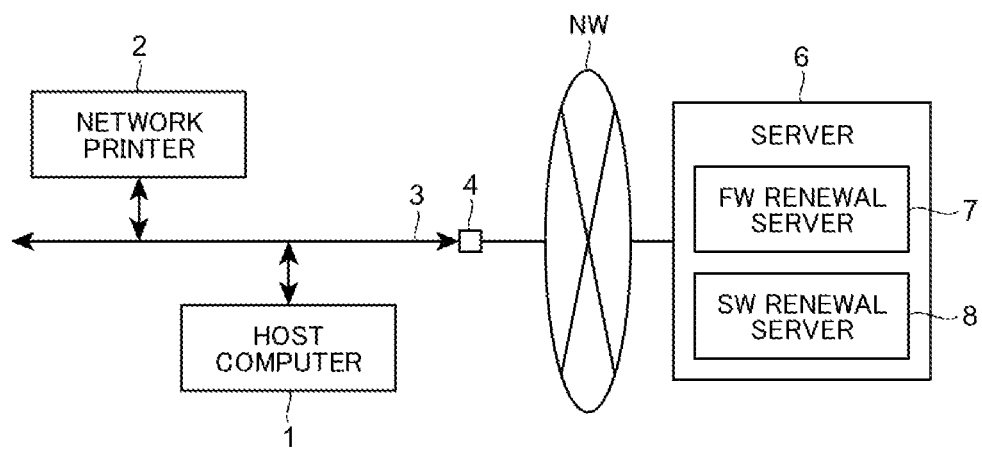
FIG. 1 is a diagram schematically showing an example of a printing system including a host computer serving as an information processing apparatus according to a first embodiment of the invention.

Hereinafter, referring to the drawings, various embodiments according to the invention will be described.
First Embodiment FIG. 1 is a diagram schematically showing an example of a printing system including a host computer 1 serving as an information processing apparatus according to the first embodiment of the invention. The printing system shown in FIG. 1 is constituted of the host computer 1, a network printer 2 serving as an electronic device operating using firmware, and a LAN (local area network) 3 rendering the host computer 1 and the network printer 2 communicable mutually. The LAN 3 is a telecommunication line provided in a relatively narrow area in the same building or region, and is connected to a wide area telecommunication network NW via a node 4 such as a rooter device. For example, the Internet can be exemplified as the wide area telecommunication network NW but the network NW is not limited to this.

A server 6 is connected to the wide area telecommunication network NW. The server 6 includes an FW (firmware) renewal server 7 for transmitting firmware data of the updated version according to a request from the host computer 1, and an SW (software) renewal server 8 for transmitting software data of the updated version according to a transmission request from the host computer 1. The FW renewal server 7 and the SW renewal server 8 herein are incorporated in the same server 6, but are not limited to this structure.

Figure 2:
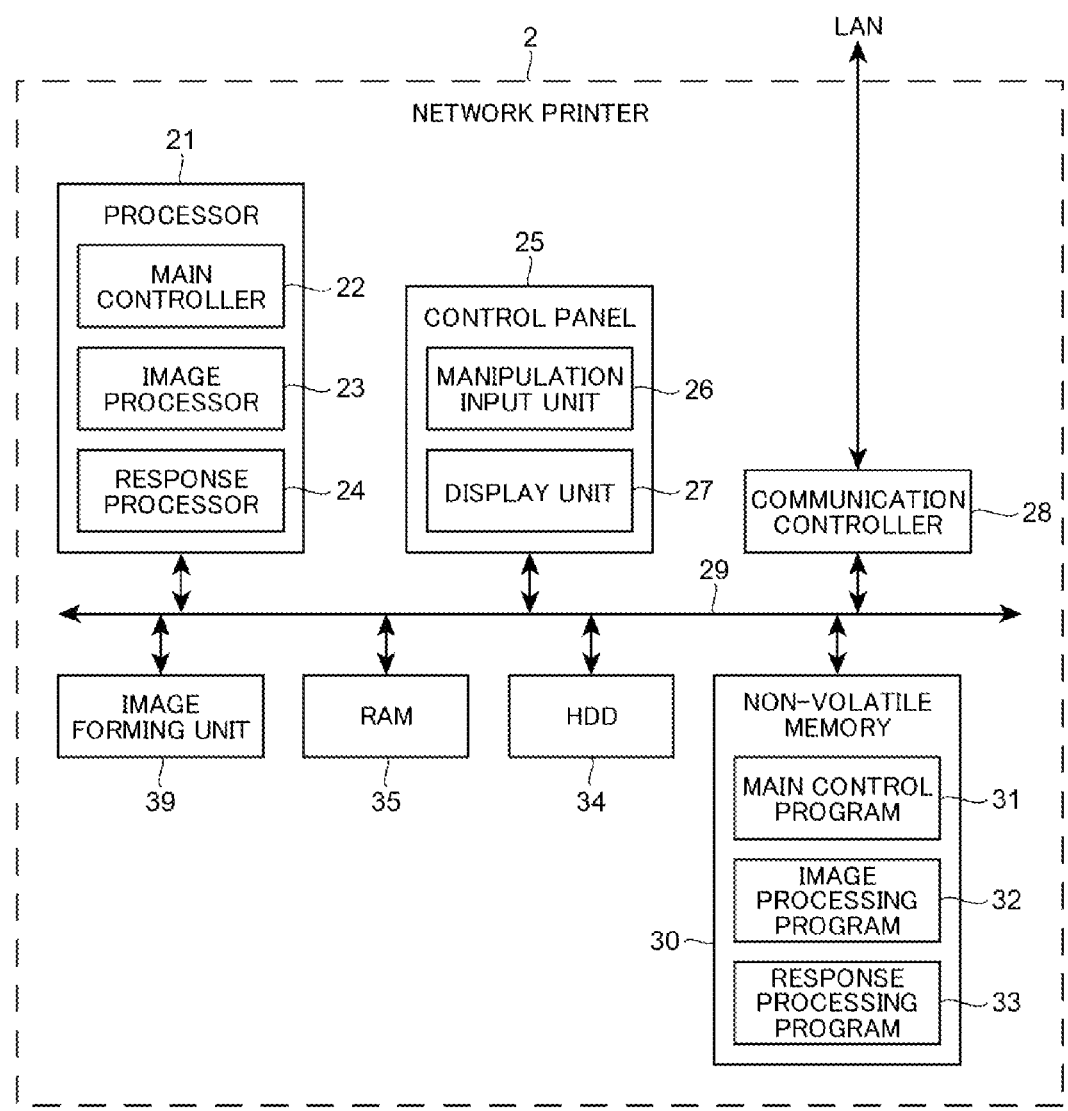
FIG. 2 is a block diagram schematically showing a structural example of a network printer.

FIG. 2 is a block diagram schematically showing a structural example of the network printer 2. As shown in FIG. 2, the network printer 2 includes a processor 21 controlling the whole operation of the network printer 2, a control panel 22, a communication controller 28 communicable in a bidirectional way among other telecommunication devices, a non-volatile memory 30 storing plural kinds of programs 31 to 33, a HDD (hard disc drive) 34, a RAM 35 used for working memory by the processor 21, an image forming unit 39 for forming printing images on a medium to be printed in a sheet shape, and a system bus 29. The processor 21, the control panel 25, the communication controller 28, the non-volatile memory 30, the HDD 34, the RAM 35, and the image forming unit 39 can mutually send and receive data signals and the control signals via the system bus 29.

The processor 21 has a central processing unit (CPU), and realizes a main controller 22, an image processor 23, and a response processor 24 by loading the computer programs from the non-volatile memory 30 and executing the programs. As such the non-volatile memory 30, a re-writable semiconductor memory such as a flash memory retaining data without power supply may be usable. The non-volatile memory 30 stores in advance a main control program 31 for realizing functions of the main controller 22, an image processing program 32 realizing functions of the image processor 23, and a response processing program 33 realizing functions of the response processor 24.

The main controller 22 operating on the processor 21 has a function controlling the whole operation of the network printer 2.

The response processor 24 operating on the processor 21 has a function to analyze received information received at the communication controller 28 from the host computer 1 and to transfer the received information to other processors according to the analyzed consequences. The response processor 24 supplies the received information to the main controller 22 in a case where the received information is control information controlling operation of the network printer 2, and supplies the received information to the information processor 23 in a case where the received information is printing job data instructing printing.

The image forming unit 39 is a printing apparatus operating in an electrophotographic method or an inkjet method. A printing apparatus operating in a method other than the electrophotographic method and the inkjet method may be used. The image processor 23 operating on the processor 21 analyzes the printing job data received from the host computer 1 and produces image data (printing data) to be printed based on the analysis consequence. The image processor 23 transfers the printing data to the image forming unit 39 and can render the unit 39 form the printing image provided as the printing data on a printing medium.

The control panel 25 includes a manipulation input unit 26 and a display unit 27. The manipulation input unit 26 is, e.g., an input device having entry keys and entry buttons. The user can input information into the processor 21 by manipulating the manipulation input unit 26. The display unit 27 is, e.g., a displaying device such as a liquid crystal display or an organic EL panel and has a function to display a screen supplied or designated by the processor 21, e.g., a screen indicating a setting status or current operation status.

Figure 3:
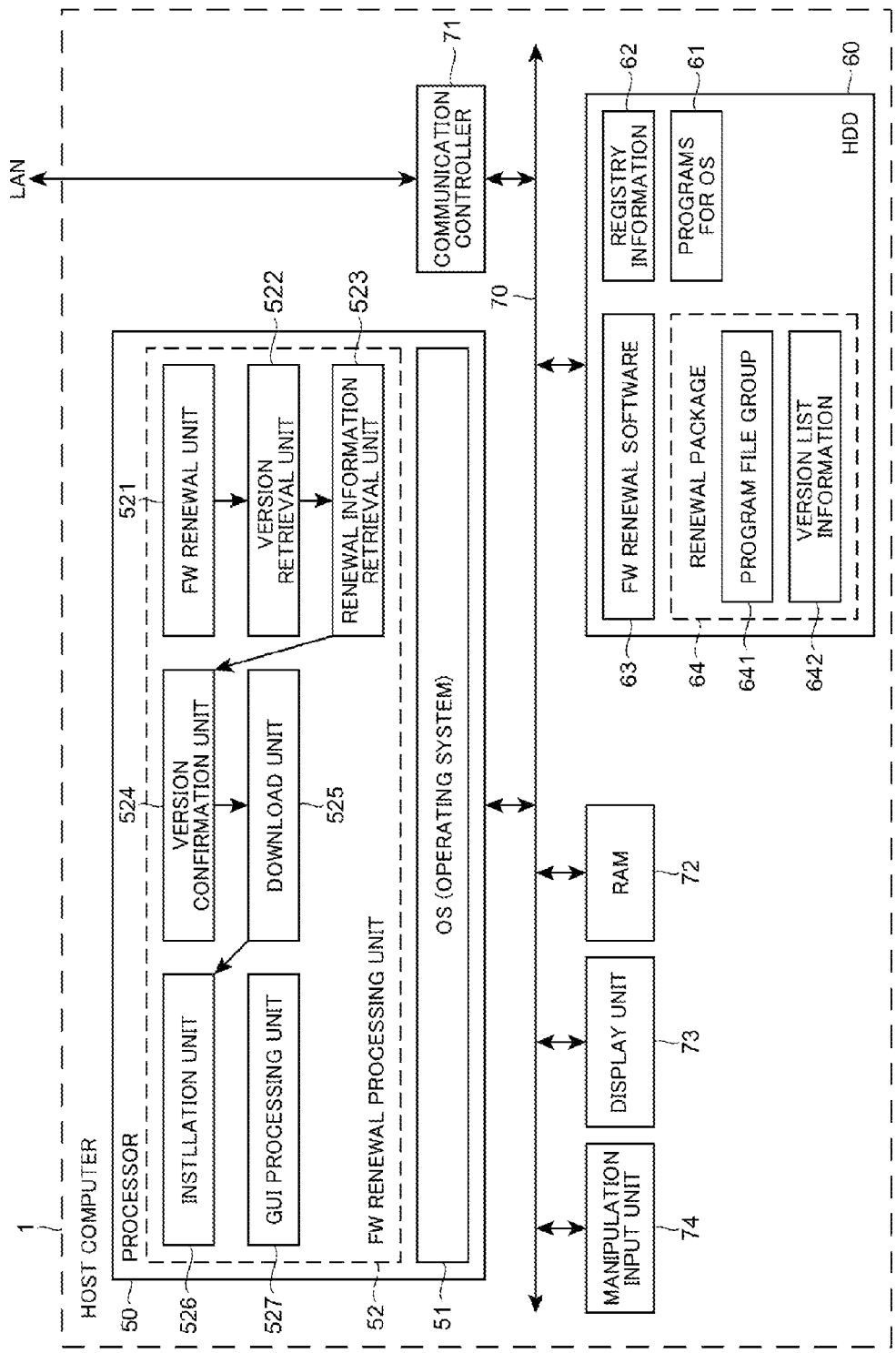
FIG. 3 is a block diagram showing a structural outline of the host computer according to the first embodiment.

FIG. 3 is a block diagram showing a schematic structure of the host computer 1. As shown in FIG. 3, the host computer 1 includes a processor 50 controlling the entire operation of the host computer 1, a communication controller 71 communicable in a bidirectional way among other telecommunication devices, an HDD 60 storing plural kinds of software (programs) 61, 63, 64, a RAM 72 used for temporarily reading and writing data as a working memory, a display unit 73 displaying image information, a manipulation input unit 74, and a system bus 70. The processor 50, the HDD 60, the RAM 72, the display unit 73, and the manipulation input unit 74 can mutually communicate data signals and control signals via the system bus 70.

The manipulation input unit 74 is structured of an input device such as, e.g., entry keys and entry buttons, and a pointing device. The user can enter information into the processor 50 by manipulating the manipulation input unit 74. The display unit 73 is formed of, e.g., a liquid crystal display device or a CRT (Cathode Ray Tube), and displays image information produced at the processor 50.

The processor 50 includes a single or plural central processing units (CPUs), and operates the OS (operating system) 51 by loading and executing the program for OS 61 from the HDD 60. The OS 51 operating on the processor 50 manages the whole system of the host computer 1. The memory region of the HDD 60 stores registry information 62 containing various kinds of setting information of the OS 51. The OS 51 can operate based on the registry information 62. The processor 50 can render an FW renewal processing unit 52 operate on the OS 51 by loading and executing FW renewal software 63 from the HDD 60.

The HDD 60 further can store a renewal package (update package) 64 made of a program file group 641 and version list information 642. As described below, the FW renewal server 7 shown in FIG. 1 can provide the renewal package 64 to the host computer 1 in response to a sending request.

Figure 4:
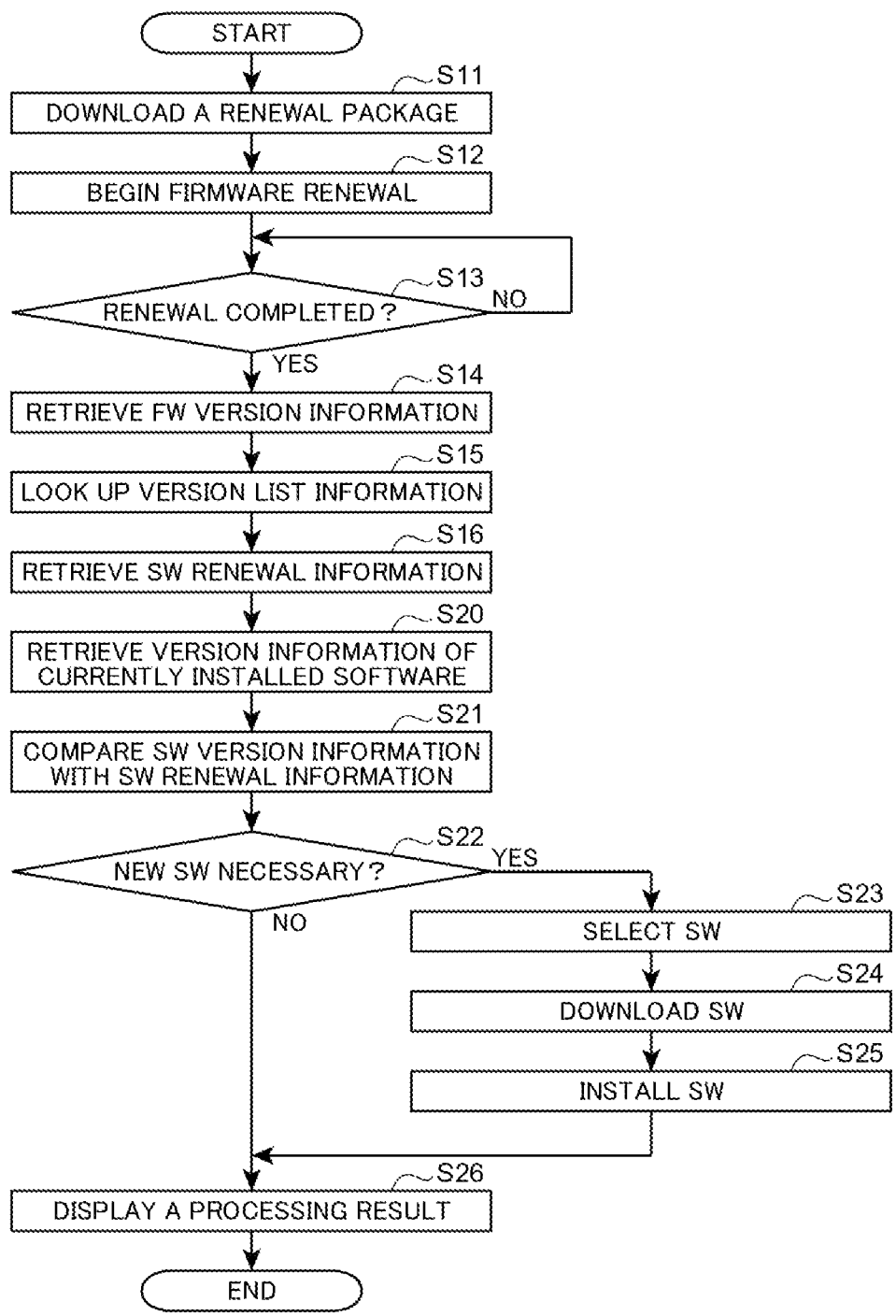
FIG. 4 is a flowchart showing steps of a firmware renewing processing done at a firmware renewing processing unit according to the first embodiment.

The FW renewal processing unit 52 includes, as shown in FIG. 3, an FW renewal unit (firmware renewal unit) 521, a version retrieval unit 522, a renewal information retrieval unit 523, a version confirmation unit 524, a download unit 525, an installation unit 526, and a GUI processing unit 527. FIG. 4 is a flowchart schematically showing steps of a firmware renewal processing done with the FW renewal processing unit 52. Hereinafter, referring to FIG. 4, the function of the FW renewal processing unit 52 is described.

The FW renewal unit 521 can download the renewal package 64 including the firmware of the latest version from the FW renewal server 7 shown in FIG. 1 (step S11 in FIG. 4). More specifically, when the FW renewal unit 521 requests the renewal package 64 to the FW renewal server 7 via the communication controller 71, the FW renewal server 7 sends the renewal package 64 to the host computer 1 in response to the request. The FW renewal unit 521 receives the renewal package 64 via the communication controller 71 and stores the package in the HDD 60.

Subsequently, the FW renewal unit 521 sends the renewal package 64 including the firmware to the network printer 2 via the communication controller 71 to start the renewal of the firmware of the network printer 2 (step S12 in FIG. 4). The response processor 24 (see, FIG. 2) of the network printer 2 receives the renewal package 64 via the communication controller 28, and provides the renewal package 64 to the main controller 22. The main controller 22 analyzes the renewal package 64 and makes a renewal of the current firmware (the main control program 31, the image processing program 32, and the response processing program 33) with the new firmware (update program) contained in the renewal package 64 based on the analysis consequence. After completion of the renewal, the main controller 22 notifies the host computer 1 of a completion of the renewal via the communication controller 28.

The FW renewal unit 521 of the host computer 1 keeps waiting until receiving the notice of the renewal completion (No at step S13). If receiving the notice of the renewal completion, the FW renewal unit 521 notifies the version retrieval unit 522 of the reception of the notice (Yes at step S13).

The version retrieval unit 522 retrieves the FW version information (firmware version information) indicating the version of the firmware after the renewal from the network printer 2 in response to the notice of the renewal completion from the FW renewal unit 521 (step S14). More specifically, the version retrieval unit 522 requests the FW version information to the network printer 2, and the network printer 2 sends the FW version information to the host computer 1 in response to the request. The version retrieval unit 522 provides the retrieved FW version information to the renewal information retrieval unit 523.

The renewal information retrieval unit 523 looks up the version list information (compatibility information) 642 in the HDD 60 using the FW version information (step S15), detects the version of the software compatible with the post-renewal firmware, and produces software renewal information indicating the detected consequence (step S16). More specifically, because the version list information 642 includes compatibility information indicating compatibilities between the post-renewal firmware and the various kinds of software, the renewal information retrieval unit 523 can detect the version of the software compatible with the post-renewal firmware using the version list information 642.

FIG. 5A is a table showing an example of the version list information 642. The version list information 642 shown in FIG. 5A is information showing a relationship between the version number of the firmware version (FW version) and three kinds of software compatible with those ("Color Utility," "Network Utility," and "Scanner Utility"). The term "Color Utility" is a name of the software for adjusting color space, e.g., hue, of image data according to a printing function of the network printer 2. The term "Network Utility" is a name of software for setting network, e.g., setting of IP addresses, regarding the network printer 2. The term "Scanner Utility" is a name of software for remote controlling a scanner function in a case where the network printer 2 has a scanner function reading images of original documents.

In the table shown in FIG. 5A, the first column (SW Version 1) stores the version numbers of "Color Utility" corresponding to the version numbers of the firmware; the second column (SW Version 2) stores the version numbers of "Network Utility" corresponding to the version numbers of the firmware; the third column (SW Version 3) stores the version numbers of "Scanner Utility" corresponding to the version numbers of the firmware. For utility software unable to link the firmware, data corresponding to "-" as illustrated are stored in the table.

In the table shown in FIG. 5A, the table also stores network addresses or URLs (uniform resource locator) indicating locations or server at which utility software of the respective versions is available. For example, the table stores a code string of HypertextTransferProtocol://WorldWideWeb.samples.co.jp/colorsw.HypertextMarkupLanguage (hypothetical URL) as the network address showing the location at which Color Utility is available.

As shown in FIG. 5A, the firmware of the version 1.0.1 is compatible only with Color Utility of the version 1.1.0 but not compatible with any of Network Utility and Scanner Utility. The firmware of the version 1.0.2 is compatible with Color Utility of the version 1.1.4 and Network Utility of the version 1.0.5 but not compatible with Scanner Utility. The firmware of the version 1.0.3 is compatible with Color Utility of the version 1.1.5, Network Utility of the version 1.0.6, and Scanner Utility of the version 1.0.0.

The renewal information retrieval unit 523 can retrieve the version information of software compatible with the post-renewal firmware based on the version list information 642. For example, where the post-renewal firmware has the version 1.0.3, the renewal information retrieval unit 523 extracts the software renewal information shown in FIG. 5B from the version list information 642 shown in FIG. 5A. The software renewal information is given to the version confirmation unit 524.

The version confirmation unit 524 retrieves the version information of the software currently installed (step S20). The version confirmation unit 524 compares the version information with the software renewal information (step S21), and judges as to whether it is required to install software of a new version (step S22). If the software of a version older than the version indicated on the software renewal information is installed, or if the software of the version indicated on the software renewal information is not installed, the version confirmation unit 524 makes a judgment that software of a new version has to be installed (Yes step S22), and selects the software of the new version (step S23). The selected consequence is notified to the download unit 525.

More specifically, the version confirmation unit 524 first searches the registry information 62 in the HDD 60, and tries to find out information coinciding to the name or names of the software indicated on the software renewal information. If any information coinciding to the name or names of the software indicated on the software renewal information is found, the information is information of the software currently installed. The version confirmation unit 524 retrieves the value corresponding to a registry key of the coinciding information, or namely the version number of the software currently installed.

FIG. 5C is a table of an example of registry information 62. The registry information 62 stores combinations of keys indicating path information of the registries and values indicating version numbers of installed software. In FIG. 5C, what are shown are the value (=1.0.1) of the version number of "Color Utility" and the value (=1.0.6) of the version number of "Network Utility." Because the version number of "Scanner Utility" is not stored in the registry information 62 shown in FIG. 5C, "Scanner Utility" is not installed in the host computer 1.

The version confirmation unit 524 can choose software newly required upon comparing the version number retrieved from the registry information 62 the software renewal information. For example, with the example shown in FIG. 5C, the value (=1.0.1) of the version number of "Color Utility" currently installed is smaller than the value (=1.1.5) of the version number contained in the software renewal information in FIG. 5B, so that the current version of "Color Utility" is not compatible with the post-renewal firmware. The value (=1.0.6) of the version number of "Network Utility" currently installed is same as the value (=1.0.6) of the version number contained in the software renewal information in FIG. 5B, so that the current version of "Network Utility" is compatible with the post-renewal firmware. "Scanner Utility" compatible with the post-renewal firmware is not installed. Accordingly, with the example shown in FIG. 5C, "Network Utility" of the version 1.1.5 and "Scanner Utility" of the version 1.0.0 are chosen as newly required software. FIG. 6 is a table of information thus chosen.

The download unit 525 makes an access to the SW renewal server 8 (shown in FIG. 1) on a network address designated with the version list information 642, and downloads the software selected by the version confirmation unit 524 from the SW renewal server 8 (step S24 in FIG. 4). The installation unit 526 installs the downloaded software in the host computer 1, thereby making the software operable on the OS 51.

The GUI processing unit 527 is for providing graphical user interfaces. When installation of the software is completed, the GUI processing unit 527 renders the display unit 73 display a message that the installation completed (step S26). To the contrary, when the version confirmation unit 524 did not choose any newly required installation (No at step S22), the GUI processing unit 527 renders the display unit 73 display a message that no newly required installation was chosen (step S26). FIG. 7A shows an example of a message box that a software installation was completed, and FIG. 7B shows an example of a message box that there is no newly required software. The user can erase those message boxes from the displayed screen by selecting the "OK" button in the boxes shown in FIG. 7A and 7B.

In this embodiment, if it is judged that software of a version to be newly installed is required (Yes at step S22), the software of the version is selected (step S23), downloaded (step S24), and installed (step S25). Instead of those steps, if it is judged that software of a version to be newly installed is required (Yes at step S22), without executing steps S23, S24, S25, the GUI processing unit 527 may render the display unit 73 display a message that it is required to install the software of this version or may output an acoustic signal from a speaker, to inform the user.

As described above, when renewing or updating the firmware of the network printer 2, the host computer 1 according to the first embodiment can automatically renew or re-install the version of the software operating in association with the firmware to a proper new version, or can newly install a new version. Accordingly, the printing system can operate the post-renewal firmware at the network printer 2 as well as the software at the host computer 1 in a mutually associated manner without any incompatibility.

Second Embodiment

Figure 8:
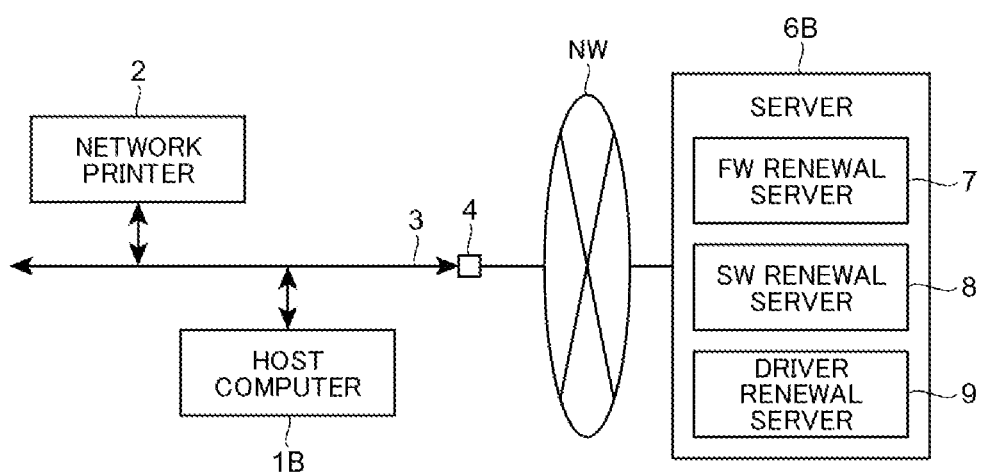
FIG. 8 is a diagram schematically showing an example of a printing system including a host computer serving as an information processing apparatus according to a second embodiment of the invention.

Next, a second embodiment of the invention is described. FIG. 8 is a diagram schematically showing an example of a printing system including a host computer 1B serving as an information processing apparatus according to the second embodiment of the invention. The printing system shown in FIG. 8 includes the host computer 1B, a network printer 2 serving as an electronic device operating using firmware, and a LAN (local area network) 3 rendering the host computer 1B and the network printer 2 communicable mutually. The LAN 3 is a telecommunication line provided in a relatively narrow area in the same building or region, and is connected to a wide area telecommunication network NW via a node 4 such as a rooter device.

The structure of the network printer 2 shown in FIG. 8 is the same as the structure of the network printer 2 shown in FIG. 1 according to the first embodiment.

A server 6B is connected to the wide area telecommunication network NW. The server 6B includes an FW renewal server 7, an SW renewal server 8, and a driver renewal server 9. The functions of the FW renewal server 7 and the SW renewal server 8 shown in FIG. 8 are the same as the functions of the FW renewal server 7 and the SW renewal server 8, shown in FIG. 1, according to the first embodiment. The driver renewal server 9 has a function to transmit driver software (hereinafter referred to simply as "driver") of the latest version in response to a request from the host computer 1B. The FW renewal server 7, the SW renewal server 8, and the driver renewal server 9 herein are incorporated in the same server 6B, but are not limited to this structure.

Figure 9:
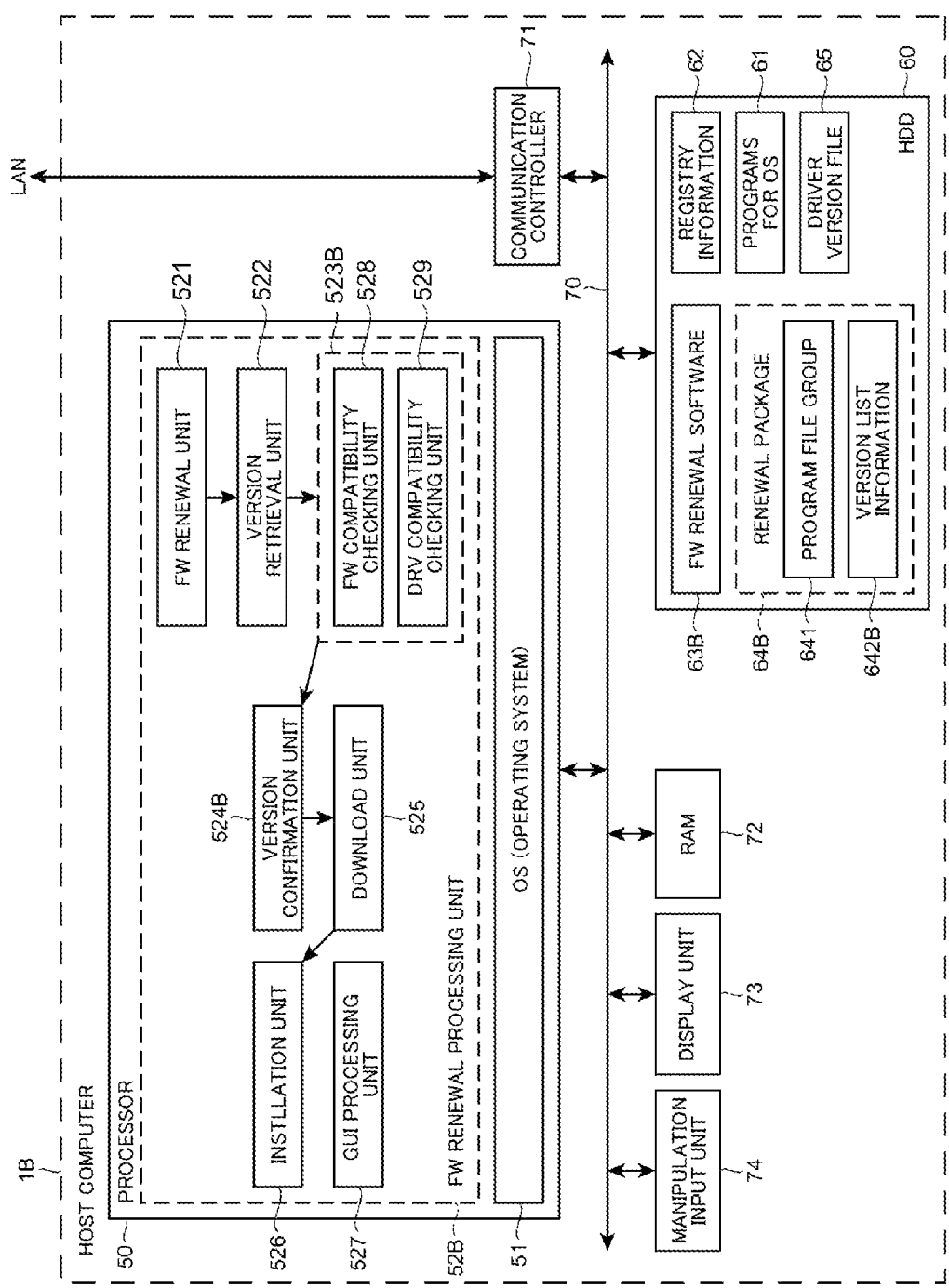
FIG. 9 is a block diagram showing a structural outline of the host computer according to the second embodiment.

FIG. 9 is a block diagram showing a schematic structure of the host computer 1B according to the second embodiment. As shown in FIG. 9, the host computer 1B includes a processor 50 controlling the entire operation of the host computer 1B, a communication controller 71 communicable in a bidirectional way among other telecommunication devices, an HDD (hard disc drive) 60 storing plural kinds of software (programs) 61, 63B, 64B, a RAM 72 used for temporarily reading and writing data as a working memory, a display unit 73 displaying image information, a manipulation input unit 74, and a system bus 70.

Hardware structures of the processor 50, the HDD 60, the RAM 72, the display unit 73, the manipulation input unit 74, and the system bus 70, shown in FIG. 9 are the same as the hardware structures (see, FIG. 3) of the processor 50, the HDD 60, the RAM 72, the display unit 73, the manipulation input unit 74, and the system bus 70 according to the first embodiment.

The processor 50 according to the second embodiment operates the OS (operating system) 51 by loading and executing the program for OS 61 from the HDD 60 in substantially the same way as the first embodiment. The OS 51 can operate based on the registry information 62 stored in the HDD 60. The processor 50 can render an FW renewal processing unit 52B operate on the OS 51 by loading and executing FW renewal software 63B from the HDD 60.

A program file group 641 among a renewal package 64B stored in the HDD 60 is the same as the program file group 641 according to the first embodiment. The version list information 642B has substantially the same information as the version list information 642 of the first embodiment as described below, and further has compatibility information indicating compatibility among plural kinds of software.

The FW renewal processing unit 52B as shown in FIG. 9 includes an FW renewal unit (firmware renewal unit) 521, a version retrieval unit 522, a renewal information retrieval unit 523B, a version confirmation unit 524B, a download unit 525, an installation unit 526, and a GUI processing unit 527. The functions of structural elements, or namely the FW renewal unit 521, the version retrieval unit 522, the download unit 525, the installation unit 526, and the GUI processing unit 527, other than the renewal information retrieval unit 523B and the version confirmation unit 524B, among the structural elements of the FW renewal processing unit 52B are the same as the functions of the FW renewal unit 521, the version retrieval unit 522, the download unit 525, the installation unit 526, and the GUI processing unit 527 according to the first embodiment, respectively.

The renewal information retrieval unit 523B of the second embodiment is constituted of an FW compatibility checking unit (firmware compatibility checking unit) 528, and a DRV compatibility checking unit (driver software compatibility checking unit) 529. The function of the FW compatibility checking unit 528 is substantially the same as the function of the renewal information retrieval unit 523 of the first embodiment.

Figure 10:
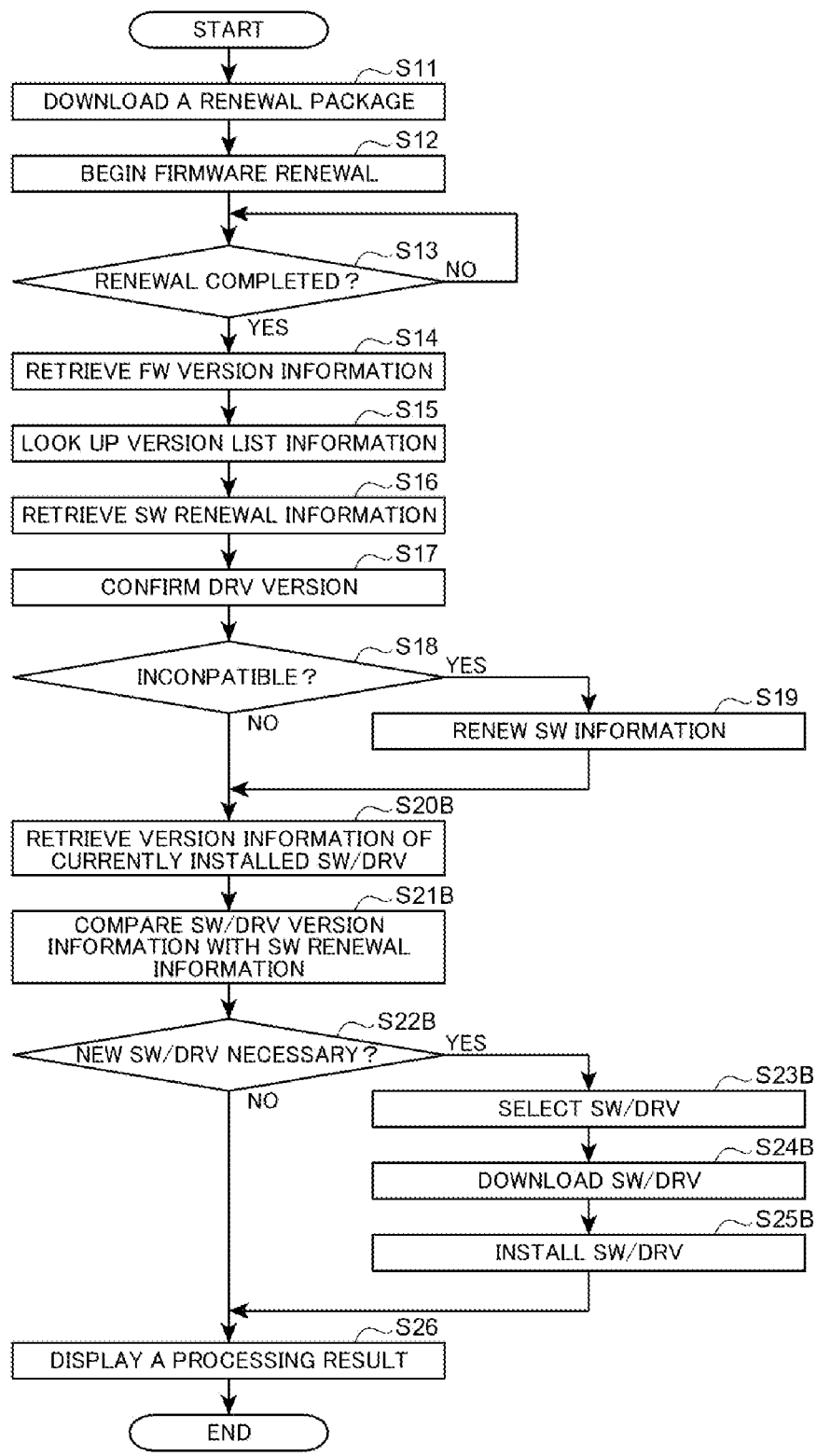
FIG. 10 is a flowchart showing steps of a firmware renewing processing done at a firmware renewing processing unit according to the second embodiment.

FIG. 10 is a flowchart showing steps of a firmware renewing processing done at the FW renewing processing unit 52B according to the second embodiment. Hereinafter, referring to FIG. 10, the function of the FW renewing processing unit 52B is described.

Similarly to the situation of the first embodiment, the FW renewal unit 521 can download the renewal package 64B including the firmware of the latest version from the FW renewal server 7 in FIG. 8 (step S11 in FIG. 10). The FW renewal unit 521 transmits the renewal package 64B including the firmware to the network printer 2 via the communication controller 71 and begins renewal of the firmware of the network printer 2 (step S12). Subsequently, when the renewal is completed (Yes at step S13), the version retrieval unit 522 retrieves the FW information indicating the version of the post-renewal firmware from the network printer 2 in response to the renewal completion notice from the FW renewal unit 521 (step S14).

The FW compatibility checking unit 528 looks up the version list information 642B or namely compatibility information in the HDD 60 using the FW version information (step S15), and produces the software renewal information indicating a detection consequence upon detecting the version of software compatible with the post-renewal firmware (step S16).

FIG. 11 is a table showing an example of the version list information 642B according to the second embodiment. The version list information 642B shown in FIG. 11 has information indicating relationship between the version number of the firmware (FW version) and the versions of four kinds of software compatible with the firmware ("Color Utility," "Network Utility," "Scanner Utility," and "C2222, C:¥Driver, OKJ3C039"). As described above, the term "Color Utility" is a name of the software for adjusting color space of image data according to a printing function of the network printer 2. The term "Network Utility" is a name of software for setting network regarding the network printer 2. The term "Scanner Utility" is a name of software for remote controlling a scanner function in a case where the network printer 2 has a scanner function reading images of original documents.

The term "C2222, C:¥Driver, OKJ3C039" is a code string indicating driver software operating on the OS51. Hereinafter, this driver software is simply referred to as "C2222."

In substantially the same way as in the table shown in FIG. 5A, at the table shown in FIG. 11, the first column (SW Version 1) stores the version numbers of "Color Utility" corresponding to the version numbers of the firmware; the second column (SW Version 2) stores the version numbers of "Network Utility" corresponding to the version numbers of the firmware; the third column (SW Version 3) stores the version numbers of "Scanner Utility" corresponding to the version numbers of the firmware; the fourth column (DRV Version) stores the version numbers of driver software "C2222" corresponding to the version numbers of the firmware. For utility software unable to link the firmware, data corresponding to "-" as illustrated are stored in the table.

In the table shown in FIG. 11, the table also stores network addresses or URLs (uniform resource locator) indicating locations or server at which utility software of the respective versions is available.

Furthermore in the table shown in FIG. 11, the table stores, at each version of the firmware, information indicating compatibilities (DRV: n. n. n; wherein n is integer) between the utility software ("Color Utility," "Network Utility," and "Scanner Utility") and the version of the driver software. For example, it is turned out that "Color Utility" compatible with the version 1.0.1 of the firmware is compatible with the driver of the version 1.0.0. For utility software unnecessary to associate the driver, data corresponding to "-" as illustrated are stored at positions indicating the versions of the driver in the table.

The FW compatibility checking unit 528 can retrieve the version information of the software compatible with the post-renewal firmware based on the version list information 642B. For example, where the version of the post-renewal firmware is "1.0.3," the renewal information retrieval unit 523 can extract the software renewal information shown in FIG. 12A from the version list information 642B shown in FIG. 11. The software renewal information is provided to the DRV compatibility checking unit 529.

The DRV compatibility checking unit 529 confirms the driver version with respect to the software indicated with the software renewal information, and checks as to whether the driver is compatible among the plural kinds of the software (step S17). More specifically, for example, in a case of the software renewal information shown in FIG. 12A, the driver versions compatible with "Color Utility," "Network Utility," and "Scanner Utility" are "1.0.6," "-(arbitrary)," and "1.0.0." To the contrary, the version of the driver software of the fourth column is "1.0.1."

The DRV compatibility checking unit 529 renews the software renewal information as to eliminate incompatibility (step S19) if such incompatibility exists (Yes step S18) as a checking result, and renders the processing go to step 20 if no incompatibility exists (No step S18). More specifically, in a case of the software renewal information as shown in FIG. 12A, the version number (=1.0.5) of the driver software necessary for "Color Utility" is higher than the version number (=1.0.1) of the driver software of the fourth column. Therefore, the DRV compatibility checking unit 529 makes a renewal the software renewal information by correcting the version number of the driver software of the fourth column of the software renewal information to the number "1.0.5," which is the highest among the version numbers of the drivers necessary for all kinds of the software (step S19). FIG. 12B is a table exemplifying contents of software renewal information after renewal. The software renewal information is provided to the version confirmation unit 524B.

Then, the version confirmation unit 524B retrieves the version information of the currently installed utility software and the driver software (step S20B). More specifically, the version confirmation 524B can retrieve the version information of the utility software by looking up the registry information 62 in the HDD 60 in substantially the same way as the version confirmation unit 524 according to the first embodiment. FIG. 12C is a table of an example of the registry information 62. The version confirmation unit 524B can retrieve the version information of the currently installed driver software. FIG. 13 is a diagram showing an example of contents of a driver version file 65. FIG. 13 shows data of "01/20/20" as the installation date of the driver and "1.0.1" as the version number.

The version confirmation unit 524B then compares the version information with the software renewal information (step S21B), and judges as to whether the software of a version to be newly installed is necessary (step S22B). If the software of a version older than the version indicated by the software renewal information is installed, or if no software of a version indicated by the software renewal information is installed, the version confirmation unit 524B judges that the software of a version to be newly installed is necessary (Yes at step S22B) and selects the software of this version (step S23B). FIG. 14 is a table showing an example of the information thus selected. The selected result is notified to the download unit 525.

The download unit 525, upon reception of the notice of the selected result, makes an access to the SW renewal server 8 (FIG. 8) on the network address designated with the version list information 642B to download, from the SW renewal server 8, the utility software selected at the version confirmation unit 524B, and makes an access to the driver renewal server 9 (FIG. 8) on the network address designated by the version list information 642B to download, from the driver renewal server 9, the driver software selected by the version confirmation unit 524 (step S24B). The installation unit 526 installs the downloaded software in the host computer 1 to make the software operable on the OS 51 (step S25B).

It is to be noted that because the printer driver according to the second embodiment has an upward compatibility, where, e.g., the printer driver of the version 1.0.5 is used, the printer driver 229 can be used in a state following the function of the driver of the version 1.0.1.

The GUI processing unit 527 displays at the display unit 73 a message that the installation is completed when the installation of the software is completed (step S26B). To the contrary, when the version confirmation unit 524 dose not select newly necessary installation (No at step S22B), the GUI processing unit 527 can render the display unit 73 display a message that any newly necessary installation is not made (step S26B). FIG. 15A shows an example of a message box displaying a massage that the installation of the software is completed; FIG. 15B shows an example of a message box displaying a massage that no newly necessary software exists. The user can eliminates the message boxes from the displaying screen by choosing the "OK" button in the message box shown in FIGS. 15A and 15B upon controlling the manipulation input unit 74.

In this embodiment, if it is judged as the software of a version to be newly installed is required (Yes step S22B), the software of this version is selected (step S23B), downloaded (step S24B), and installed (step S25B). Instead of those steps, if it is judged as the software of a version to be newly installed is required (Yes step S22B), without executing steps S23B, S24B, S25B, the GUI processing unit 527 may render the display unit 73 display a message that it is required to install the software of this version or may output an acoustic signal from a speaker, to inform the user.

As described above, according to the second embodiment, in addition to substantially the same advantages of the first embodiment, the version of the printer driver necessary for the renewed utility software is confirmed, and the printer driver can be automatically renewed when necessary. Accordingly, the printing system can surely avoid using each of the firmware, the utility software, and the printer driver as having incompatibility therebetween.

As described above, although various embodiments according to the invention are described in referring to the drawings, those are exemplified as this invention, and various forms or modifications other than above embodiments can be used. For example, this invention is not limited only to the information processing apparatus such as, e.g., a host computer connected to a telecommunication line such as, e.g., a network, but also this invention is applicable to printers, facsimile machines, MFPs (Multi-Function Peripherals), photocopiers, scanners, and information processing apparatuses connecting to a network. The MFP can be an image forming apparatus having plural functions such as, e.g., photocopier, printer, image scanner, and facsimile machine.

It will be appreciated by those skilled in the art that changes could be made to the embodiments described above without departing from the broad inventive concept thereof It is understood, therefore, that this invention is not limited to the particular embodiments disclosed, but it is intended to cover modifications within the spirit and scope of the present invention as defined by the appended claims.

What is claimed is:

1. An information processing apparatus having software installed therein, the software operable in relation to firmware embedded in an electronic device; the information processing apparatus comprising:
   a processor configured to:
      update first firmware embedded in the electronic device to second firmware;
      detect first software and second software, the first software and the second software having compatibility with the second firmware, and generate software update information based on a detection result, wherein the first software is different than the second software;
      prior to installation of the first software and/or the second software in the information processing apparatus:
         check compatibility between the first software and the second software,
         change the software update information when the second software is incompatible with the first software; and
         determine whether or not the first software and/or the second software are to be installed in the information processing apparatus based on the software update information; and
      install the first software and/or the second software in the information processing apparatus based on a result of the determination regarding whether or not the first software and/or the second software are to be installed in the information processing apparatus based on the software update information.

2. The information processing apparatus according to claim 1, wherein the processor is further configured to:
retrieve firmware version information of the second firmware from the electronic device, and
detect the first software and the second software based on the firmware version information.

3. The information processing apparatus according to claim 1, wherein the processor is further configured to check compatibility between the first software and the second software based on a first version number of the first software and a second version number of the second software, respectively.

4. The information processing apparatus according to claim 3, wherein the processor is further configured to judge that the second software is incompatible with the first software when the first version number is higher than the second version number, and
change the software update information such that the second version number is compatible with the first version number when the processor judges that the second software is incompatible with the first software.

5. The information processing apparatus according to claim 1, wherein the software update information includes a first version number of the first software and a second version number of the second software,
wherein the processor compares the first version number of the first software and a third version number of third software already installed in the information processing apparatus, and the processor determines to install the first software in the information processing apparatus when the first version number is higher than the third version number, and
wherein the processor compares the second version number of the second software and a fourth version number of fourth software already installed in the information processing apparatus, and the processor determines to install the second software in the information processing apparatus when the second version number is higher than the fourth version number.

6. The information processing apparatus according to claim 1, wherein the first software is utility software, and the second software is driver software, and
wherein the processor checks compatibility between the utility software and the driver software based on a first driver version number of the utility software and a second driver version number of the driver software.

7. The information processing apparatus according to claim 6, wherein the processor judges that the driver software is incompatible with the utility software when the first driver version number is higher than the second driver version number, and
wherein the processor changes the software update information such that the second driver version number is compatible with the first driver version number when the processor judges that the driver software is incompatible with the utility software.

8. The information processing apparatus according to claim 1, wherein the first software is first utility software and the second software is first driver software,
wherein the software update information includes a first utility version number of the first utility software and a first driver version number of the first driver software,
wherein the processor compares the first utility version number of the first utility software and a second utility version number of second utility software already installed in the information processing apparatus, and the processor determines to install the first utility software in the information processing apparatus when the first utility version number is higher than the second utility version number, and
wherein the processor compares the first driver version number of the first driver software and a second driver version number of second driver software already installed in the information processing apparatus, and the processor determines to install the first driver software in the information processing apparatus when the first driver version number is higher than the second driver version number.

9. The information processing apparatus according to claim 1, further comprising a communication controller configured to be communicable with a server storing the second firmware,
wherein the processor retrieves the second firmware from the server via the communication controller.

10. The information processing apparatus according to claim 1, further comprising:
a communication controller configured to be communicable with a server storing the first software and the second software; and
wherein the processor is further configured to download the first software and the second software from the server via the communication controller.

11. A firmware updating method in an information processing apparatus having software installed therein, the software operable in relation to firmware embedded in an electronic device, the firmware updating method comprising the steps of:
updating first firmware embedded in the electronic device to second firmware;
detecting first software and second software, the first software and the second software having compatibility with the second firmware, the first software being different than the second software;
generating software update information based on a detection result at the detecting step;
prior to installation of the first software and/or the second software in the information processing apparatus:
checking compatibility between the first software and the second software;
changing the software update information when the second software is judged as being incompatible with the first software at the checking step; and
determining whether the first software and/or the second software are to be installed in the information processing apparatus based on the software update information; and
installing the first software and/or the second software in the information processing apparatus based on a result of the determination regarding whether the first software and/or the second software are to be installed in the information processing apparatus based on the software update information.

12. The firmware updating method according to claim 11, further comprising the steps of:
retrieving firmware version information of the second firmware from the electronic device; and
detecting the first software and the second software based on the firmware version information at the detecting step.

13. The firmware updating method according to claim 11, wherein compatibility between the first software and the second software is checked based on a first version number of the first software and a second version number of the second software at the checking step.

14. The firmware updating method according to claim 13,
wherein the second software is judged as being incompatible with the first software when the first version number is higher than the second version number at the checking step, and
wherein the software update information is changed such that the second version number is compatible with the first version number when the second software is incompatible with the first software at the changing step.

15. The firmware updating method according to claim 11,
wherein the software update information includes a first version number of the first software and a second version number of the second software,
wherein at the determining step, the first version number of the first software is compared with a third version number of third software already installed in the information processing apparatus, and when the first version number is higher than the third version number, the first software is determined to be installed in the information processing apparatus, and
wherein at the determining step, the second version number of the second software is compared with a fourth version number of fourth software already installed in the information processing apparatus, and when the second version number is higher than the fourth version number, the second software is determined to be installed in the information processing apparatus.

16. The firmware updating method according to claim 11,
wherein the first software is utility software and the second software is driver software, and
wherein at the checking step, compatibility between the utility software and the driver software is checked based on a first driver version number of the utility software and a second driver version number of the driver software.

17. The firmware updating method according to claim 16,
wherein at the checking step, when the first driver version number is higher than the second driver version number, the driver software is judged as being incompatible with the utility software, and
wherein at the changing step, when the driver software is incompatible with the utility software, the software update information is changed such that the second driver version number is compatible with the first driver version number.

18. The firmware updating method according to claim 11,
wherein the first software is first utility software and the second software is first driver software,
wherein the software update information includes a first utility version number of the first utility software and a first driver version number of the first driver software,
wherein at the determining step, the first utility version number of the first utility software is compared with a second utility version number of second utility software already installed in the information processing apparatus, and when the first utility version number is higher than the second utility version number, the first utility software is determined to be installed in the information processing apparatus, and
wherein at the determining step, the first driver version number of the first driver software is compared with a second driver version number of second driver software already installed in the information processing apparatus, and when the first driver version number is higher than the second driver version number, the first driver software is determined to be installed in the information processing apparatus.

19. The firmware updating method according to claim 11, further comprising the step of retrieving the second firmware from a server storing the second firmware.

20. The firmware updating method according to claim 11, further comprising the step of downloading the first software and the second software from a server storing the first software and the second software.

* * * * *